(12) United States Patent
Perlman

(10) Patent No.: US 7,398,322 B1
(45) Date of Patent: Jul. 8, 2008

(54) SYSTEM USING ROUTING BRIDGES TO TRANSPARENTLY INTERCONNECT MULTIPLE NETWORK LINKS TO FORM A SINGLE VIRTUAL NETWORK LINK

(75) Inventor: Radia J. Perlman, Sammamish, WA (US)

(73) Assignee: Sun Microsystems, Inc., Santa Clara, CA (US)

(*) Notice: Subject to any disclaimer, the term of this patent is extended or adjusted under 35 U.S.C. 154(b) by 1004 days.

(21) Appl. No.: 10/824,974

(22) Filed: Apr. 14, 2004

Related U.S. Application Data

(60) Provisional application No. 60/476,470, filed on Jun. 6, 2003, provisional application No. 60/472,222, filed on May 20, 2003.

(51) Int. Cl.
*G06F 15/173* (2006.01)
(52) U.S. Cl. .......................... 709/239; 709/238
(58) Field of Classification Search .............. 709/238, 709/239, 249, 245; 370/401, 222, 403
See application file for complete search history.

(56) References Cited

U.S. PATENT DOCUMENTS

| | | | |
|---|---|---|---|
| 6,438,133 B1* | 8/2002 | Ervin et al. | 370/403 |
| 6,603,769 B1* | 8/2003 | Thubert et al. | 370/401 |
| 6,657,951 B1* | 12/2003 | Carroll et al. | 370/222 |
| 6,747,979 B1* | 6/2004 | Banks et al. | 370/401 |
| 6,785,738 B1* | 8/2004 | Ivaturi | 709/245 |
| 2002/0013856 A1* | 1/2002 | Garcia-Luna-Aceves et al. | 709/238 |
| 2002/0099855 A1* | 7/2002 | Bass et al. | 709/249 |

* cited by examiner

*Primary Examiner*—Le Luu
(74) *Attorney, Agent, or Firm*—Park, Vaughan & Fleming LLP

(57) ABSTRACT

One embodiment of the present invention provides a system that transparently interconnects multiple network links into a single virtual network link. During operation, a Rbridge (Rbridge) within the system receives a packet, wherein the Rbridge belongs to a set of one or more Rbridges that transparently interconnect the multiple network links into the single virtual network link. These Rbridges automatically obtain information specifying which endnodes are located on the multiple network links without the endnodes having to proactively announce their presence to the Rbridges. If a destination for the packet resides on the same virtual network link, the Rbridge routes the packet to the destination. This route can be an optimal path to the destination, and is not constrained to lie along a spanning tree through the set of Rbridges.

40 Claims, 2 Drawing Sheets

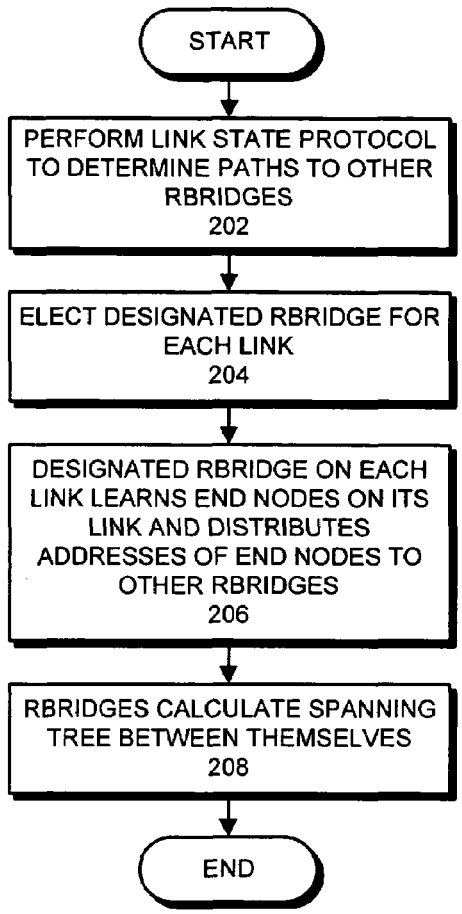
FIG. 2
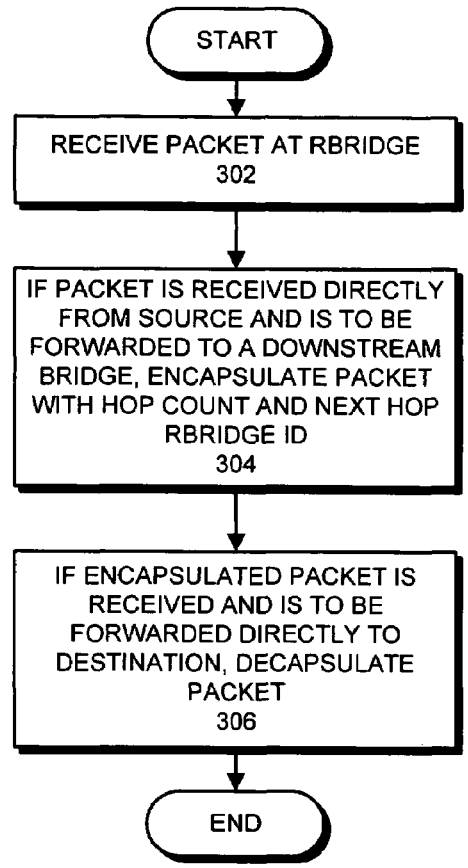
FIG. 3
| PROTOCOL TYPE (= ENCAPS) 401 | HOP COUNT 402 | TRANS RBRIDGE 403 | NEXT HOP RBRIDGE 404 | ORIGINAL PACKET 405 |
ENCAPSULATED PACKET 400
FIG. 4

SYSTEM USING ROUTING BRIDGES TO TRANSPARENTLY INTERCONNECT MULTIPLE NETWORK LINKS TO FORM A SINGLE VIRTUAL NETWORK LINK

RELATED APPLICATIONS

This application hereby claims priority under 35 U.S.C. §119 to U.S. Provisional Patent Application No. 60/472,222 filed on 20 May 2003, entitled "Multilink Campus Routing with the IP Protocol," by inventor Radia J. Perlman, and to U.S. Provisional Patent Application No. 60/476,470 filed on 6 Jun. 2003, entitled "Multilink Campus Routing with the IP Protocol," by inventor Radia J. Perlman.

BACKGROUND

1. Field of the Invention

The present invention relates to the design of computer networks. More specifically, the present invention relates to a method and an apparatus for transparently interconnecting multiple network links into what appears to be a single virtual network link.

2. Related Art

Bridges are commonly used to transparently interconnect many physical links into what appears to the Internet Protocol (IP) (or a layer 2 protocol) to be a single LAN. However, this transparency is bought at a price. It requires the topology on which traffic is forwarded to be a tree. This causes traffic concentration on links that were chosen for the spanning tree. It also causes suboptimal paths.

In addition, bridge forwarding can be dangerous. There is no hop count in the header, and worse yet, bridges forward onto multiple ports (when the location of the destination is unknown), and multiple bridges might choose to forward a packet seen on a link. This causes exponential proliferation of packets. As a result, bridges need to be conservative about forwarding onto new links, in order to avoid temporary loops. The spanning tree as originally designed used a timer to avoid temporary loops (see Perlman, R., "A Protocol for Distributed Computation of a Spanning Tree in an Extended LAN", *9th Data Communications Symposium*, Vancouver, 1985). Since then various optimizations have been proposed, such as making a special case of ports for which the neighbor is known to be an endnode (rather than another switch). If the assumption is correct that the neighbor is an endnode, there is no danger of loops by immediately starting to forward on that port.

Given the possibility of exponential proliferation during temporary loops, the spanning tree technique can become unstable. Attempts to make it less conservative in order to forward more quickly are likely to increase the number of such incidents. In a distributed technique, there is no way, based on totally local information, for a bridge to know it is safe to start forwarding onto a new link. And even if such a technique were to be devised, a component such as a repeater can cause a loop which bridges would not be able to prevent.

So why not simply use routing? The IP protocol (v4) is pretty much universal. However, it is not universal. There are other layer 3 protocols that are in use, and there are some protocols, such as intermediate system-to-intermediate system (IS-IS), or local area transport (LAT), which work directly over layer 2.

Even if the IP protocol were universal, however, it has a disadvantage. IP routes only to links. Each link is assigned an address prefix, and all IP nodes on that link must have an IP address with that prefix, and any node not on that link must have an IP address that does not start with that prefix. That means that a node that has multiple links must have multiple addresses, and a node that moves from one link to another must change its address.

Note that for the purposes of this disclosure, IPv6 is sufficiently similar to IPv4 that throughout this disclosure "IP" is intended to mean both IPv4 and IPv6. Differences such as the use of the "neighbor discovery" protocol for IPv6 vs. ARP for IPv4 are straightforward translations of functionality.

Another disadvantage of IP routing is that it requires configuration. It has improved over the years with the addition of protocols such as the Dynamic Host Configuration Protocol (DHCP). However, the routers need to be configured with prefixes for the links. There have been proposals for having routers within a campus, given a prefix, automatically subdivide the prefix into link-specific prefixes, so that each link within a "campus" would automatically have its own unique prefix within the shorter campus-wide prefix. This approach avoids configuration of the routers, but still has disadvantages:

a node that moves within the campus must change its address;

a node that has attachments to multiple links must have multiple addresses; and it is wasteful of IP addresses, since it is impractical to make sure that every link is fully populated (makes full use of its prefix).

The ConnectionLess Network Protocol (CLNP) is a protocol similar to IP (see "Protocol for Providing the OSI Connectionless-Mode Network Service", ISO 8473). However, unlike IP, in CLNP there is no link-specific prefix. Instead there is the concept of "level 1 routing" within an area. An area may contain many links. All nodes within the area share the same prefix. A node with multiple links within the area can have a single layer 3 address, and a node that moves within the area need not change its layer 3 address. CLNP could do this because all CLNP endnodes implemented a protocol known as the End-System-to-Intermediate-System (ES-IS) protocol. The ES-IS protocol has endnodes periodically announce themselves, to an address listened to by the routers, so that all the routers on the link know which endnodes are on that link, and can detect (based on no longer receiving ES Hello messages) when an endnode has gone down or moved.

Because of the ES-IS protocol, an area can have an arbitrary physical topology and routers can route to endnodes using a shortest path technique. Unfortunately, IP endnodes cannot be relied upon to do any such announcements.

Hence, what is needed is a method and an apparatus for transparently interconnecting multiple network links into what appears to be a single virtual network link without the problems described above.

SUMMARY

One embodiment of the present invention provides a system that transparently interconnects multiple network links into a single virtual network link. During operation, a routing bridge (Rbridge) within the system receives a packet, wherein the Rbridge belongs to a set of one or more Rbridges that transparently interconnect the multiple network links into the single virtual network link. These Rbridges automatically obtain information specifying which endnodes are located on the multiple network links without the endnodes having to proactively announce their presence to the Rbridges. If a destination for the packet resides on the same virtual network link, the Rbridge routes the packet to the destination. This route can be an optimal path to the destination, and is not constrained to lie along a spanning tree through the set of Rbridges.

(When we say that end nodes "proactively announcing their presence" we mean that they periodically announce their presence without being solicited to do so, and without having data to send.)

In a variation on this embodiment, endnodes on the multiple network links send packets to each other through the Internet Protocol (IP). Additionally, all endnodes on the multiple network links that comprise the single virtual network link have an address with the same prefix, or have an address with a prefix from the same set of prefixes.

In a variation on this embodiment, automatically obtaining the information specifying which endnodes are located on the multiple network links involves an Rbridge performing a distributed query to other Rbridges, asking them to initiate an ARP query (IPv4), or to send a neighbor discovery solicitation message (IPv6). In this variation, an Rbridge replies to an ARP query (IPv4) or a neighbor solicitation message (IPv6) from a node on its local link regarding a target node on a different link within the virtual network link with the layer 2 address of the target node.

In a variation on this embodiment, if the layer 3 destination for the packet does not reside on the same virtual network link, the system routes the packet based on the layer 2 destination address specified by the source of the packet.

In a variation on this embodiment, routing the packet to the destination involves ensuring that the packet includes a hop count to avoid problems with temporary loops. This hop count can be maintained in either a layer 3 header of the packet or an encapsulation header.

In a variation on this embodiment, the Rbridges automatically obtain information specifying where endnodes are located by examining data packets.

In a further variation, at the sending end, when the Rbridge receives the packet directly from a sender and the Rbridge is forwarding the packet to a downstream Rbridge, the Rbridge modifies the packet to indicate that the packet is in-transit. On receiving end, when the Rbridge receives the packet from an upstream Rbridge and when the Rbridge is forwarding the packet directly to the destination, the Rbridge undoes the modification to the packet to indicate that the packet is no longer in transit.

In a variation on this embodiment, Rbridges automatically obtain information specifying where endnodes are located by examining control packets, such as IPv4 address resolution protocol (ARP) packets or IPv6 neighborhood discovery packets.

In a variation on this embodiment, the Rbridges automatically obtain information specifying where endnodes are located by periodically polling the endnodes.

In a variation on this embodiment, if the Rbridge cannot determine which link the destination is located on, the packet is sent along a spanning tree through the Rbridges.

In a variation on this embodiment, if the Rbridge does not know which link the destination is located on, the Rbridges attempt to locate the destination by sending a distributed query through a spanning tree to all the Rbridges, where on each link an Rbridge makes a query to the destination, where if the destination resides on that link, it will respond to the query. Then the Rbridge that has located the destination informs the other Rbridges of the destination's location, in its link state information.

In a variation on this embodiment, wherein when forwarding an IP packet to the destination link, the system uses a special source address in the layer 2 header to indicate to Rbridges that this packet did not originate on that link, and instead was forwarded onto that link by an Rbridge.

BRIEF DESCRIPTION OF THE FIGURES

FIG. 2 presents a flow chart illustrating how Rbridges configure themselves and obtain link state information in accordance with an embodiment of the present invention.

FIG. 3 presents a flow chart illustrating how a Rbridge forwards a packet in accordance with an embodiment of the present invention.

FIG. 4 illustrates an encapsulated packet in accordance with an embodiment of the present invention.

DETAILED DESCRIPTION

Figure 1:
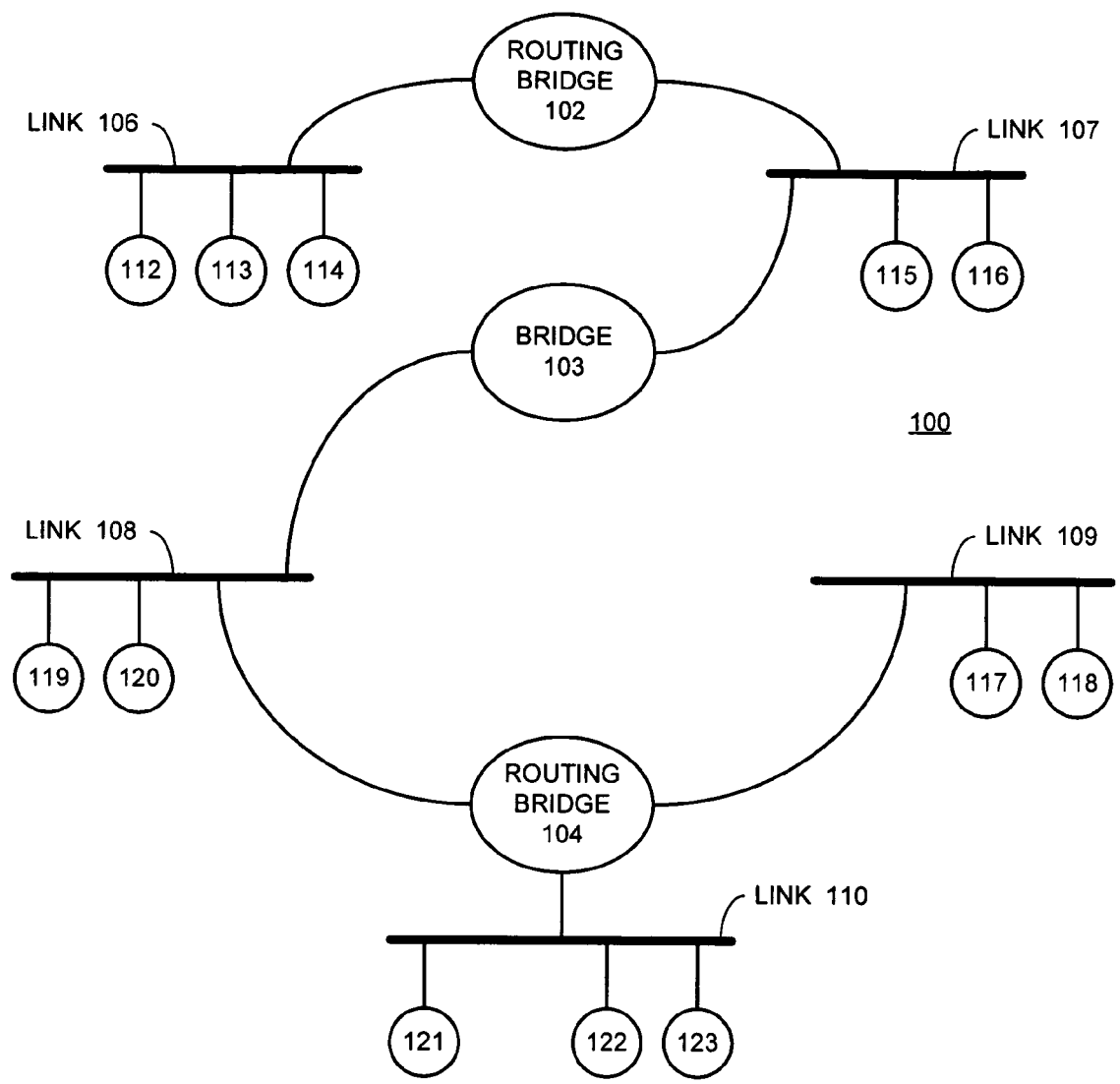
FIG. 1 illustrates an exemplary network including bridges in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The Network

FIG. 1 illustrates an exemplary network 100 including a number of bridges 102-104 in accordance with an embodiment of the present invention. Bridges 102-104 are designed to transparently couple together links 106-110 so that they appear to be part of a single combined network. More specifically, bridge 103 is a conventional bridge that forwards packets to other bridges through a spanning tree. In contrast, bridges 102 and 104 are "routing bridges" (Rbridges) which appear to the source and destination nodes to be normal bridges, but which transparently route packets between source and destination nodes. In this way, the route for a packet can be an optimal path to the destination, and is not constrained to lie along a spanning tree through the set of Rbridges. Details concerning the operation of Rbridges 102 and 104 are presented below in following sections of this disclosure.

As illustrated in FIG. 1, network 100 includes a number of links 106-110. In one embodiment of the present invention, links 106-110 are local area networks (LANs), such as Ethernet-based networks, which couple together local computing nodes (stations). More specifically, in FIG. 1, link 106 couples together nodes 112-114 and Rbridge 102; link 107 couples together nodes 115-116, Rbridge 102 and bridge 103; link 108 couples together nodes 119-120, bridge 103 and Rbridge 104; link 109 couples together nodes 117-118 and Rbridge 104; and link 110 couples together nodes 121-123 and Rbridge 104.

Rbridge Design

The routing bridge (Rbridge) design presented in this disclosure accomplishes several things:

- it coexists with standard bridges, so that a bridged campus can be upgraded slowly, by replacing bridges one at a time with Rbridges. The more Rbridges, the more advantages of Rbridges will be gained, such as more optimal use of the topology;
- it allows interconnection of IP nodes within a campus with a result similar to a CLNP area, but without relying on IP endnodes to do anything new;
- it bridges layer 2 protocols (where "bridges" means transparently interconnects), while being able to maintain shortest paths and safe routing within the campus;
- as a result of working at layer 2, and making no assumptions about higher layers, it works for any layer 3 protocol;
- it makes no assumptions about physical topology. Not only is the inter-switch topology unconstrained, but inter-switch links may be shared media, with endnodes residing on these links;
- In many cases Rbridges will support dissimilar layer 2 technologies. This disclosure will describe what mechanisms will be needed, and what cases will not work.

The disclosure also presents variations that drop various assumptions, such as the functional requirement of supporting anything other than IP, or the assumption that endnodes might reside on shared media inter-switch links. Dropping the requirement to support anything other than IP avoids the necessity for the Rbridge to learn station location from data packets, and avoids the necessity of encapsulation, two Rbridge requirements that present implementation difficulties for some switch hardware. Note, though, that the design optimized for IP can coexist with a design that handles non-IP packets, much like routers could route some protocols and bridge the others.

Basic Rbridge Design

The basic design of an Rbridge includes several features, some of which are highlighted in the flow chart that appears in FIG. 2. (Note that the operations that appear in FIG. 2 do not necessarily take place in the order indicated in FIG. 2):

- Within a campus, Rbridges execute a link state protocol such as IS-IS, so that all Rbridges know a path to each other Rbridge (step 202 in FIG. 2). IS-IS is a particularly good choice because of its flexible encoding that allows including new information (such as layer 2 addresses of reachable endnodes).
- On each link, a single Rbridge is elected "Designated Rbridge" (DR) (step 204 in FIG. 2). The DR is the only Rbridge on that link that is allowed to learn the membership of endnodes on that link, and is the only Rbridge allowed to forward traffic onto that link that is destined for that link.
- The DR, like a bridge, learns which endnodes are located on its link by observing the source address of packets that have originated on that link.
- The Rbridge distributes the addresses of endnodes on its link in the link state protocol. This enables all Rbridges to know which Rbridge is the appropriate destination Rbridge for each endnode (step 206 in FIG. 2).
- The egress Rbridge from a link (usually the DR, but an optimization would allow another Rbridge to forward a packet off the link) encapsulates the packet with an additional header that contains, at the minimum, a hop count, and preferably also a next hop Rbridge identifier.
- Packets in transit are distinguished from originating packets, since they contain the encapsulation header. Therefore, there is no confusion between packets originating on a link and packets transiting that link; the DR will know not to assume that the source of a transit packet resides on the link from which the packet was received.
- Rbridges additionally calculate a spanning tree (step 208 in FIG. 2). This is for the purpose of delivering layer 2 multicast packets, packets to unknown destinations, and distributed destination-location queries. (Note that in IPv4 a "distributed destination-location query" involves sending an ARP, whereas in IPv6 it involves sending a neighbor discovery solicitation message.) There is no need to implement an additional protocol in order to calculate a spanning tree, given that the Rbridges have a link state database.
- Calculate a spanning tree by having all the Rbridges choose one Rbridge (e.g., based on lowest ID), and calculate a tree of shortest paths from that Rbridge to each other Rbridge.
- When packets are to be sent through the spanning tree, the encapsulation header indicates the packet is to be sent through the spanning tree rather than unicast. One method of doing that is to have the layer 2 destination address be a specific layer 2 multicast address recognized by Rbridges for this purpose. The packet is forwarded through the spanning tree and each DR (in addition to forwarding it through the spanning tree), removes the encapsulation header in order to forward the packet onto the DR's link.

Referring to FIG. 3, a packet is forwarded as follows. A packet first is received at an Rbridge (step 302). On the sending end, if the packet is received directly from the source endnode, and not from another Rbridge, and if the packet is to be forwarded to a downstream Rbridge, the system encapsulates the packet with the hop count and an identifier for the next hop Rbridge (step 304). On the destination end, if the packet is encapsulated and the packet is to be forwarded directly to the destination endnode (i.e., not forwarded to another Rbridge), the system decapsulates the packet before forwarding it to the destination endnode (step 306).

This design can be thought of as performing the functionality of a bridge to endnodes, i.e., transparently interconnecting links, but it avoids the disadvantages of bridges. Since the transit packets are routed, with a header that contains a hop count, it is safe to have temporary loops. Packets directed to a specific next hop Rbridge, and only forwarded in one direction, will not proliferate (as bridged packets may) during a temporary loop, and they will quickly be discarded due to the hop count. The hop count can even be set to be exact, unlike a hop count written into the header by an endnode, since the Rbridge can calculate the number of hops necessary to reach the destination. So, ignoring for the moment packets that must be sent through the spanning tree, Rbridge routing enjoys the following advantages over 802-style bridging:

- packets travel via an optimal path;
- during temporary loops, packets do not proliferate;
- packets have a hop count; and
- temporary loops are not a problem, so routing changes can be made instantaneously based on local information, safely.

The Encapsulation Header

The goals of the encapsulation header are to:
allow Rbridges to differentiate packets originated by an endnode from transit packets;
include a hop count; and to
be compatible with bridges on the path between Rbridges.

If we want bridges to coexist with Rbridges, so that a bridge might be on the path between two Rbridges, the packet must still contain what looks like an ordinary layer 2 header, so that bridges will be able to forward it.

The way to accomplish this is to use something in the outer layer 2 header that can be recognized by Rbridges as an encapsulated packet. Referring to the exemplary encapsulated packet 400 illustrated in FIG. 4, a straightforward technique would be use a new protocol type field 401 that would mean "Rbridged encapsulated packet," which we'll call the Rbtype protocol type (or SAP). An Rbridged transit packet can comprise an otherwise normal layer 2 header with a protocol type field 401, followed by the encapsulation information including the hop count 402, the transmitting Rbridge 403, and the next hop Rbridge 404, followed by the original packet 405 as transmitted by the source. When forwarding to the destination, the encapsulation header is removed, so that the goal of transparency to endnodes is accomplished. The destination will see the packet as transmitted by the source.

The layer 2 source and destination in the outer header should be the transmitting and receiving Rbridge. It is safe for bridges to learn layer 2 addresses within the bridged spanning tree terminated by Rbridges, since that mini-LAN is a normal bridged topology in which packets travel on a spanning tree. It would not be safe for the layer 2 source address to be the original source endnode's layer 2 address, because packets are not routed along a spanning tree throughout the campus, and therefore are injected into the mini-LAN from different directions. Therefore, bridges in a mini-LAN would see packets from a MAC address appear from different directions, if a MAC address outside the mini-LAN appears as a source in the outer header. This will confuse bridges about that MAC's location, and they may filter packets destined for that address.

The addresses in the outer header must be MAC addresses local to the mini-LAN, to avoid this problem. This outer header is rewritten on an Rbridge-hop by Rbridge-hop basis.

After the outer header is any additional information of use to Rbridges. This includes the hop count, unless it is an IP packet and the Rbridges will use the hop count in the layer 3 header.

Packets for unknown destinations will be sent through the spanning tree. These can be distinguished from routed packets by using a multicast destination address and/or using a different protocol type in the outer layer 2 header.

The original packet is preserved after the encapsulation header so that the packet can be received transparently by the destination, without evidence of it having been handled by Rbridges. In the case of IP packets destined to nodes within the virtual network link, the original layer 2 header need not be preserved, and it is permissible for Rbridges to decrement the hop count, and perhaps modify other fields in the IP header.

Temporary Loops
Caused by Repeater or Bridge

If a component such as a repeater or bridge came up, it is possible that two links become merged. This could result in there temporarily being two DRs on a link. A DR will not be able to distinguish a packet from remote source S that has been decapsulated and injected by the other DR, from a packet originated by S. This will cause the DRs' learning to be faulty, and might introduce loops that are not protected by the hop count (because the hop count is removed when a DR decapsulates a packet onto the link). This is likely to be a rare event, and more quickly detected and corrected because it is link-local. It will take less time for link-specific knowledge to converge than global knowledge, which is required for the bridge spanning tree technique to converge.

This is only an issue if endnode location is done through receipt of data packets, and if the packet looks the same as forwarded by an Rbridge or as initiated by the source endnode. In the case of IP packets, it will not confuse the destination if the layer 2 source address is different from the way it was when the source launched the packet. Rbridges therefore avoid any problem caused by multiple DRs by transmitting the decapsulated packet with a layer 2 source address recognized by Rbridges as being transmitted by an Rbridge. An Rbridge would therefore know not to assume that the layer 3 source of such a packet resides on that link.

Flooded Packets

Some packets need to be flooded through the Rbridged campus along a spanning tree. Packets that need to be flooded are packets for destinations whose location is unknown, or packets with layer 2 multicast addresses. Just as unicast routing can have temporary loops, since a distributed technique cannot have all nodes instantaneously switch to a new topology, the spanning tree might temporarily have loops. With unicast routing loops, packets will not proliferate. With a spanning tree loop, packets will be duplicated.

However, the Rbridge spanning tree is far less dangerous than the 802-bridge spanning tree, because the encapsulation header contains a hop count. The Rbridge that injects the spanning tree packet into the Rbridge cloud can calculate the minimal hop count necessary for the packet. Additionally, for each port, the Rbridge can calculate a different hop count (in case leaves on one port are further away than leaves on another port).

Because of the hop count, spanning tree loops will, in practice, be unlikely to cause much harm. However, Rbridges can add additional conservative measures to prevent even the limited proliferation. As with regular bridges, they can impose a timer before starting to forward flooded packets onto new links. And given that they have a link state database, they can even calculate whether forwarding flooded packets onto a new link might cause a temporary loop.

Note that this section is only concerned with messages that must be flooded. Messages that are directed to a known destination location will not have any danger of being proliferated during temporary loops.

So in all cases Rbridges are far safer than regular bridges. They are not, however, as safe as CLNP level 1 routers, since CLNP level 1 routers would never need to flood packets to unknown destinations. But Rbridges work without requiring the ES-IS protocol, which only exists for CLNP.

Rbridging IP

The basic design of the Rbridge, presented above, can bridge layer 2 packets, but using optimal paths within the campus. If this is all they did, it would support IP. The campus would appear to IP to be a single LAN. However, there is one case that would not work. If the Rbridge only used layer 2 addresses, it would fail to interconnect two IP nodes within the campus if they resided on dissimilar layer 2 links, for instance ones with dissimilar addresses.

The Dissimilar Layer 2 Address Issue

Suppose source IP node S resides on a link with a different layer 2 address structure than destination IP node D. Since the Rbridged campus appears to be a single IP subnet, S will assume D is a neighbor, and issue an ARP. Unfortunately, the layer 2 address in D's reply will not be understandable to S, and not be expressible in the layer 2 header when S attempts to forward to B.

To support this case (S and D are IP nodes residing on links with incompatible layer 2 addresses), Rbridges reply to ARP queries, if necessary, with the layer 2 address of an Rbridge (see following section).

Handling ARPs

Let's say that source IP node S is on a link with DR R1, and target node D is on a link with DR R2. The goal is that when S does an ARP request for D, if the Rbridges already have learned about D, that R1 can reply with an ARP request to S, informing S of D's layer 2 address, without needing to flood the ARP request to other links.

We'd also like to support the case where S and D have incompatible layer 2 addresses. In this case R1 will reply to the ARP request with R1's layer 2 address.

How do the Rbridges learn the ARP information? Let's assume that S wishes to speak to D. S issues an ARP request. S's DR, R1, replaces the source S in the ARP query with its own address, and remembers (S, D) so that, when it receives the ARP reply from D, it sends an ARP reply to S. Each Rbridge R2, in addition to forwarding the flooded ARP request through the spanning tree, sends an ARP query on its own LAN, with itself (R2) as source, remembering that if it receives a reply from D it must send an ARP reply to R1.

When R2 (the DR on D's link) receives an ARP reply ("my layer 2 address is d") from D, R2 sends an ARP reply to R1, and also reports ownership of (D, d) in its link state information. The other Rbridges will now know the location of IP destination D, and the associated layer 2 address d.

To avoid a denial of service attack by having S issue too many ARP queries (which result in flooded packets and a lot of processing by Rbridges), the R1 will remember recent ARP queries, and refuse to issue another ARP query for D for some time.

If a second node, S2, on R1's link, issues an ARP query for D between the time S issued its query and D's reply is returned, R1 does not flood an ARP query. Instead, R1 remembers that an ARP reply from D (triggered by S's ARP query) should be sent to both S and S2.

In the case where D's layer 2 address is incompatible with the querying node S, S's DR (R1) replies to the ARP with R1's layer 2 address. This design has the following properties:

ARP queries will not need to be flooded once the Rbridges learn the location of the target IP node.

IP will work even if the source and destination within the campus reside on links with incompatible layer 2 address types.

So, when an IP source emits an ARP, it will either be told the true layer 2 address of the destination, or the layer 2 address of its own Rbridge, depending on whether the destination's layer 2 address is compatible with the source's layer 2 address.

It might be conceptually simpler to have the Rbridge always respond to an ARP query with its own layer 2 address. The reason for using the destination's layer 2 address when possible (when the layer 2 address is compatible) is so that the source IP node's ARP cache will not need to change when the local Rbridge goes down and a different DR is elected.

An alternative design could use a logical layer 2 address for the Rbridge, say X. In this alternate design all IP endnode ARP caches would indicate X as the layer 2 address of all destinations.

There might be true bridges mixed in with the Rbridges (and transparent to the Rbridges, just as bridges are transparent to routers). Therefore, X must not be used as a source address, so that its location will not be learned by bridges.

One other issue is a timing issue. It is possible that S will receive the ARP reply before R2's link state information has propagated. This case would be handled by a pure Rbridge (one that forwards based solely on layer 2 addresses) like a packet to an unknown destination; the packet will be flooded. For Rbridges forwarding IP packets based on the IP header (see section VI), this would cause the Rbridge that does not know the (IP, layer 2) binding to issue an ARP. It could store the data packet until the ARP reply was received, or flood the packet, or drop the packet.

Prompt Dead-Node Detection for IP

Rbridges can take advantage of the properties of IP in order to detect in a prompt manner when an IP node has moved or has died. With layer 2, there is no protocol in which a node is required to answer. However, with IP, if the DR knows that (D, d) resides on its LAN, the DR can periodically issue ARP queries for D (or any other packets that IP node D will respond to) to reassure itself that D still resides on its LAN.

Optimizing the Path

If the DR is always the egress and ingress point for the link, it is possible for packets to be two hops suboptimal. Given a particular source and destination, the ingress DR and the egress DR might each be one-hop suboptimal. This suboptimality would only occur on shared media. Most topologies today really consist of switches and point-to-point links. If all the switches were Rbridges, and all links are point-to-point, then there would be no such sub-optimality.

However, if there are shared links (or switched links with the switches being bridges, so the link would appear to the Rbridge as if it were a shared link), there can be up to a 2-hop sub-optimality.

The first hop's sub-optimality can be avoided by having the Rbridges on the link implement a careful technique in which they calculate, for each destination, which of them is the optimal Rbridge for handling the packet. This can be done by calculating a Dijkstra tree with the link as the Root, and with a deterministic tie-breaker.

The sub-optimality at the destination cannot be avoided, since it would be dangerous for any Rbridge other than the DR to inject a decapsulated packet onto the link. The DR would not be able to distinguish that from a packet that originated on that link, and the DR would falsely assume the source address in the packet resided on that link.

There is another form of route sub-optimality. In IP, there might be several routers on the link, and endnodes on the link would choose a router, essentially at random, for forwarding packets to destinations that are not on that IP subnet (that do not share the same campus-wide prefix as the source IP node). IP already has the mechanism, if a router forwards a packet onto the same link from which it was received, for the router to send a Redirect message. This will avoid many cases of sub-optimality.

Traffic Engineering

Note that Rbridges perform routing operations, and therefore can do any sort of routing that routers do. In some networks, it is desirable to use Multi-Protocol Label Switching (MPLS) in order to create special routing, for instance, to allow certain customers to have paths that have certain service guarantees. This is not incompatible with the Rbridge concept.

Less General Rbridges

In this section we drop some of the generality of the Rbridge, and see what advantages it can give.

Transit Links Switch-Switch Only

If we assume that endnodes only exist on leaf links, and switches are aware of which ports are endnode ports, then there is no necessity to restrict endnode location learning. Each Rbridge is allowed to learn station locations for each of its ports on which an endnode might reside. We avoid the one-hop sub-optimality trivially since there is only one Rbridge on each endnode link.

If we are really sure that an inter-switch link will never be mistaken for an endnode link, then encapsulation would not be required for Rbridge learning. However, the encapsulation header includes a hop count, making forwarding during temporary loops safer. (Note that even without the hop count, Rbridge forwarding of packets for known destinations is safer than bridge forwarding, since Rbridges, like routers, will forward only in one direction.) However, for Rbridge flooded packets, without the encapsulation header, Rbridge forwarding would be as dangerous as bridge flooding.

IP-Specialized Rbridge

Two requirements of the Rbridge design presented in the rest of the disclosure are implementation challenges for some switch hardware. These requirements are:
the necessity to learn when forwarding data packets; and
the necessity to encapsulate and decapsulate packets.

These requirements can be avoided by dropping the goal of supporting anything other than IP for packets destined within the virtual network link. However, encapsulation will still be required for packets destined outside the virtual network link, in order to direct the packet to the specific IP router connecting this virtual network link with external IP destinations, chosen by the source endnode. In this section we will assume all packets are IP packets.

Avoiding Encapsulation

There are three reasons for the encapsulation header: to have a hop count for safety; to distinguish transit packets from endnode-originated packets; and to distinguish packets to be flooded from those to known destinations.

Note that we will assume that IP packets also contain a layer 2 header. What we are avoiding is the use of an additional layer 2 header.

Hop Count

We will not need the encapsulation header for carrying a hop count, since the IP header contains a hop count. Rbridges can decrement the hop count in the IP header. Some ISP customers consider an apparently small hop count across an ISP as superior service, and having Rbridges decrement the IP header's hop count would mean that the customers would see the Rbridge hops as IP hops.

One could argue (and be quite correct), that this is a completely false assumption on the part of the customer. An Rbridge hop (or a bridged hop) is no better than a router hop. Better service should be measured by metrics such as delay, bandwidth, and reliability, not by perceived numbers of hops. However, it is often politic to give the customers what they want rather than argue with them. So having Rbridges decrement the IP header hop count might be perceived as a disadvantage with some customers.

Transit Packets

Since we are assuming IP packets, it is not necessary for the original layer 2 header to preserved. Therefore, any information necessary for Rbridge forwarding can be carried in the layer 2 header.

To distinguish transit packets, we can replace the protocol type (which would indicate IP) by a protocol type indicating that it is an Rbridged transit IP packet. The layer 2 source and destination should be replaced, at each hop, by the transmitting and receiving Rbridge on that Rbridge hop.

Although this might appear to be as much work as encapsulation, this is what routers do (rewrite the layer 2 header on each hop). But it avoids the encapsulation issues of requiring an additional layer 2 header, which might violate the maximum packet size.

At the final hop, the final Rbridge replaces the protocol type to indicate to the destination that it is an IP packet.

Flooded Packets

As before, flooded packets can be distinguished by using a different reserved protocol type.

Avoiding Data Packet Learning

Some switch hardware is optimized for fast forwarding of data packets, and it is not possible for it to do anything other than forward. In particular, it cannot learn source addresses from data packets.

This form of switch is, of course, only used as a router, since bridges must learn based on data packets. But this requirement of bridges is because it is not possible to assume any sort of protocol by the endnodes.

If, however, we assume that all endnodes are only issuing IP packets, or associated control packets (such as ARP packets), then we can design an Rbridge that does need to learn from data packets.

If Rbridges will not learn IP destinations based on data packets, then they must learn them through ARP replies or link state information.

D Unknown by Endnodes and Rbridges

Let's assume that destination endnode D is unknown. Source S wishes to speak to D. S issues an ARP request. The ARP request is not a data packet, so it can be dealt with in the slow path (the control plane). The first Rbridge, R1, replaces the protocol type with a protocol type indicating "flooded ARP", replaces the source S with its own address, and remembers that, when it receives the reply from D, it must send an ARP reply to S.

Flooded ARPs can also be handled by the control plane because they can be recognized based on the protocol type. Each Rbridge R2, in addition to forwarding the flooded ARP request through the spanning tree, sends an ARP query on its own LAN, with itself (R2) as source, remembering that if it receives a reply from D it must send an ARP reply to R1. When an ARP reply is received by D, D will send the ARP reply to R2. Then R2 sends an ARP reply to R1, and also reports ownership of IP destination D, and associated layer 2 address, in its link state information. The other Rbridges will now quickly learn the location of IP destination D, and the associated layer 2 address (so they can respond locally to ARPs).

D known by Rbridzes, not by S

In this case, when source endnode S wants to talk to D, S will issue an ARP query. The first Rbridge, R1, has learned, based on link state information issued by R2, where D resides, and also what its layer 2 address is. R2 then does not forward the ARP reply, and instead answers with an ARP reply on behalf of D.

D Known by S and not by Rbridges

Endnode S might know D's layer 2 address, and yet D might be unknown to the Rbridges. This might occur because S's ARP cache might have a longer retention time than Rbridge caches. Or maybe D's Rbridge has been restarted and D is no longer included in its link state information.

So in this case an Rbridge will see a packet for an unknown IP destination address (but within the campus Rbridged prefix). Most likely this will be the first Rbridge. However, in a transition case where link state information has partially propagated, it might be a transit Rbridge. But the Rbridge will behave the same way in either case.

The Rbridge will drop the unknown IP destination packet, and instead issue an ARP query, with itself as source. This will cause a flooded ARP query, with each Rbridge issuing an ARP query on its own link. The Rbridge on D's link will receive an ARP reply, and inform the other Rbridges, through the link state flooding.

To avoid causing a lot of flooded ARP messages, Rbridges should remember recent unknown IP destinations that have caused an ARP flood, and not issue another one for some amount of time.

CONCLUSIONS

The Rbridge design achieves the transparency of bridging without the disadvantages. It achieves the ability to create a campus that looks like a single link.

The campus can include links with different layer 2 technologies. An Rbridge would not be able to allow two nodes to speak at layer 2, if they reside on incompatible link types; however, the Rbridge would enable those nodes to communicate if the nodes were speaking IP.

Rbridges have great advantages over bridging. They allow optimal paths and path splitting. They need not be conservative about creating temporary loops because packets do not proliferate, and there is a hop count. The hop count with Rbridges is set by the source Rbridge, which is armed with link state information, so that the source Rbridge can calculate the minimum necessary hop count. This means that during temporary loops unicast packets (packets to known destinations) will be removed more quickly than packets in a traditional layer 3 network.

For flooded packets (layer 2 multicast or packets to unknown destinations), Rbridges, like regular bridges, may duplicate packets during temporary loops. However, with Rbridges there is a hop count, the hop count can be set to be the minimum necessary, and additionally the Rbridge can use global information to make conservative temporary loop-avoidance decisions, so its loop-avoidance behavior will be more timely and accurate than anything a true bridge could do.

For IP packets, the Rbridge has the additional advantage that ARP packets need not be flooded, and instead can usually be answered by the source Rbridge. Additionally, the location of IP endnodes can be kept promptly up to date by using local link mechanisms such as ARP queries.

Rbridges could perform better for IP if IP included a mechanism such as ES-IS, that was universally implemented by all endnodes. But Rbridges achieve almost as good a result with no assumptions on IP behavior other than the classic IP design. If it is reasonable to only support IP endnodes, the overhead of encapsulation and learning from data packets can be avoided.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for transparently interconnecting multiple network links into a single virtual network link, comprising:
   receiving a packet at a routing bridge (Rbridge), wherein the Rbridge belongs to a set of one or more Rbridges that transparently interconnect the multiple network links into the single virtual network link;
   wherein the Rbridges automatically obtain information specifying which endnodes are located on the multiple network links without the endnodes having to proactively announce their presence to the Rbridges; and
   if a destination for the packet resides on the same virtual network link, routing the packet to the destination, wherein the route can be an optimal path to the destination, and is not constrained to lie along a spanning tree through the set of Rbridges.

2. The method of claim 1,
   wherein endnodes on the multiple network links send packets to each other through the Internet Protocol (IP); and
   wherein all endnodes on the multiple network links that comprise the single virtual network link have an address with the same prefix, or have an address with a prefix from the same set of prefixes.

3. The method of claim 1, wherein automatically obtaining the information specifying which endnodes are located on the multiple network links involves an Rbridge performing a distributed query to other Rbridges, asking them to initiate an ARP query (IPv4), or to send a neighbor discovery solicitation message (IPv6).

4. The method of claim 3, wherein an Rbridge replies to an ARP query (IPv4) or a neighbor solicitation message (IPv6) from a node on its local link regarding a target node on a different link within the virtual network link with the layer 2 address of the target node.

5. The method of claim 1, wherein if the layer 3 destination for the packet does not reside on the same virtual network link, the method further comprises routing the packet based on the layer 2 destination address specified by the source of the packet.

6. The method of claim 1, wherein routing the packet to the destination involves ensuring that the packet includes a hop count to avoid problems with temporary loops.

7. The method of claim 6, wherein the hop count is maintained in a layer 3 header of the packet.

8. The method of claim 6, wherein the hop count is added in an encapsulation header.

9. The method of claim 1, wherein the Rbridges automatically obtain information specifying where endnodes are located by examining data packets.

10. The method of claim 9,
    wherein if the Rbridge receives the packet directly from a sender and the Rbridge is forwarding the packet to a downstream Rbridge, the Rbridge modifies the packet to indicate that the packet is in-transit; and
    wherein if the Rbridge receives the packet from an upstream Rbridge and if the Rbridge is forwarding the packet directly to the destination, the Rbridge undoes the modification to the packet to indicate that the packet is no longer in transit.

11. The method of claim 1, wherein the Rbridges automatically obtain information specifying where endnodes are located by examining control packets.

12. The method of claim 11, wherein the control packets are IPv4 address resolution protocol (ARP) packets.

13. The method of claim 11, wherein the control packets are IPv6 neighborhood discovery packets.

14. The method of claim 1, wherein the Rbridges automatically obtain information specifying where endnodes are located by periodically polling the endnodes.

15. The method of claim 1, wherein if the Rbridge cannot determine which link the destination is located on, the packet is sent along a spanning tree through the Rbridges.

16. The method of claim 1, wherein when forwarding an IP packet to the destination link, the method uses a special source address in the layer 2 header to indicate to Rbridges that this packet did not originate on that link, and instead was forwarded onto that link by an Rbridge.

17. A computer-readable storage medium storing instructions that when executed by a computer cause the computer to perform a method for transparently interconnecting multiple network links into a single virtual network link, the method comprising:
    receiving a packet at a routing bridge (Rbridge), wherein the Rbridge belongs to a set of one or more Rbridges that transparently interconnect the multiple network links into the single virtual network link;
    if a destination for the packet resides on the same virtual network link, routing the packet to the destination, wherein the route can be an optimal path to the destination, and is not constrained to lie along a spanning tree through the set of Rbridges; and
    automatically obtaining information at the Rbridges specifying which endnodes are located on the multiple network links without the endnodes having to proactively announce their presence to the Rbridges.

18. The computer-readable storage medium of claim 17,
    wherein endnodes on the multiple network links send packets to each other through the Internet Protocol (IP); and
    wherein all endnodes on the multiple network links that comprise the single virtual network link have an address with the same prefix, or have an address with a prefix from the same set of prefixes.

19. The computer-readable storage medium of claim 17, wherein automatically obtaining the information specifying which endnodes are located on the multiple network links involves an Rbridge performing a distributed query to other Rbridges, asking them to initiate an ARP query (IPv4), or to send a neighbor discovery solicitation message (IPv6).

20. The computer-readable storage medium of claim 17, wherein an Rbridge replies to an ARP query (IPv4) or a neighbor solicitation message (IPv6) from a node on its local link regarding a target node on a different link within the virtual network link with the layer 2 address of the target node.

21. The computer-readable storage medium of claim 17, wherein if the layer 3 destination for the packet does not reside on the same virtual network link, the method further comprises routing the packet based on the layer 2 destination address specified by the source of the packet.

22. The computer-readable storage medium of claim 17, wherein routing the packet to the destination involves ensuring that the packet includes a hop count to avoid problems with temporary loops.

23. The computer-readable storage medium of claim 22, wherein the hop count is maintained in a layer 3 header of the packet.

24. The computer-readable storage medium of claim 22, wherein the hop count is added in an encapsulation header.

25. The computer-readable storage medium of claim 22, wherein the Rbridges automatically obtain information specifying where endnodes are located by examining data packets.

26. The computer-readable storage medium of claim 25,
    wherein if the Rbridge receives the packet directly from a sender and the Rbridge is forwarding the packet to a downstream Rbridge, the Rbridge modifies the packet to indicate that the packet is in-transit; and
    wherein if the Rbridge receives the packet from an upstream Rbridge and if the Rbridge is forwarding the packet directly to the destination, the Rbridge undoes the modification to the packet to indicate that the packet is no longer in transit.

27. The computer-readable storage medium of claim 17, wherein the Rbridges automatically obtain information specifying where endnodes are located by examining control packets.

28. The computer-readable storage medium of claim 27, wherein the control packets are IPv4 address resolution protocol (ARP) packets.

29. The method of claim 27, wherein the control packets are IPv6 neighborhood discovery packets.

30. The computer-readable storage medium of claim 17, wherein the Rbridges automatically obtain information specifying where endnodes are located by periodically polling the endnodes.

31. The computer-readable storage medium of claim 17, wherein if the Rbridge cannot determine which link the destination is located on, the packet is sent along a spanning tree through the Rbridges.

32. The apparatus of claim 17, wherein when forwarding an IP packet to the destination link, the method uses a special source address in the layer 2 header to indicate to Rbridges that this packet did not originate on that link, and instead was forwarded onto that link by an Rbridge.

33. An apparatus that transparently interconnects multiple network links into a single virtual network link, comprising:
    a routing bridge (Rbridge) that belongs to a set of one or more Rbridges that transparently interconnect the multiple network links into the single virtual network link;
    a receiving mechanism within the Rbridge configured to receive a packet;
    a link state determination mechanism, which is configured to automatically obtain information specifying which endnodes are located on the multiple network links without the endnodes having to proactively announce their presence to the Rbridges; and
    a routing mechanism within the Rbridge, wherein if a destination for the packet resides on the same virtual network link, the routing mechanism is configured to route the packet to the destination, wherein the route can be an optimal path to the destination, and is not constrained to lie along a spanning tree through the set of Rbridges.

34. The apparatus of claim 33,
    wherein endnodes on the multiple network links send packets to each other through the Internet Protocol (IP); and wherein all endnodes on the multiple network links that comprise the single virtual network link have an address with the same prefix, or have an address with a prefix from the same set of prefixes.

35. The apparatus of claim 33, wherein while automatically obtaining the information specifying which endnodes are located on the multiple network links, the link state determination mechanism is configured to cause an Rbridge to perform a distributed query to other Rbridges, asking them to initiate an ARP query (IPv4), or to send a neighbor discovery solicitation message (IPv6).

36. The apparatus of claim 35, wherein an Rbridge replies to an ARP query (IPv4) or a neighbor solicitation message (IPv6) from a node on its local link regarding a target node on a different link within the virtual network link with the layer 2 address of the target node.

37. The apparatus of claim 33, wherein if the layer 3 destination for the packet does not reside on the same virtual network link, the routing mechanism routes the packet based on the layer 2 destination address specified by the source of the packet.

38. The apparatus of claim 33, wherein the routing mechanism is configured to ensure that the packet includes a hop count to avoid problems with temporary loops.

39. The apparatus of claim 33, wherein the link state determination mechanism is configured to automatically obtain information specifying where endnodes are located by examining data packets.

40. The apparatus of claim 33, wherein the link state determination mechanism is configured to automatically obtain information specifying where endnodes are located by examining control packets.

* * * * *